United States Patent [19]
Gregg

[11] 3,969,946
[45] July 20, 1976

[54] CIRCULAR SIDE POSITIVE DRIVE BELT TEETH

[75] Inventor: Michael J. W. Gregg, Antrim, Northern Ireland

[73] Assignee: The Goodyear Tire & Rubber Company, Akron, Ohio

[22] Filed: Oct. 14, 1975

[21] Appl. No.: 622,307

Related U.S. Application Data

[63] Continuation of Ser. No. 485,642, July 3, 1974, Pat. No. 3,924,481.

[52] U.S. Cl. ............................. 74/230.5; 74/231 C; 74/243 R
[51] Int. Cl.² .................... F16H 55/36; F16G 1/28; F16G 55/30
[58] Field of Search............ 74/230.5, 231 C, 243 S, 74/243 R

[56] References Cited
UNITED STATES PATENTS

| | | | |
|---|---|---|---|
| 3,756,091 | 9/1973 | Miller | 74/231 C |
| 3,835,720 | 9/1974 | Fisher et al. | 74/231 C |
| 3,924,481 | 12/1975 | Gregg | 74/231 C |

Primary Examiner—Leonard H. Gerin
Attorney, Agent, or Firm—F. W. Brunner; R. H. Hatton

[57] ABSTRACT

A belt for use in synchronous drives which includes uniformly spaced teeth of similar shape around the inner periphery to engage the toothed gears to form the drive.

2 Claims, 5 Drawing Figures

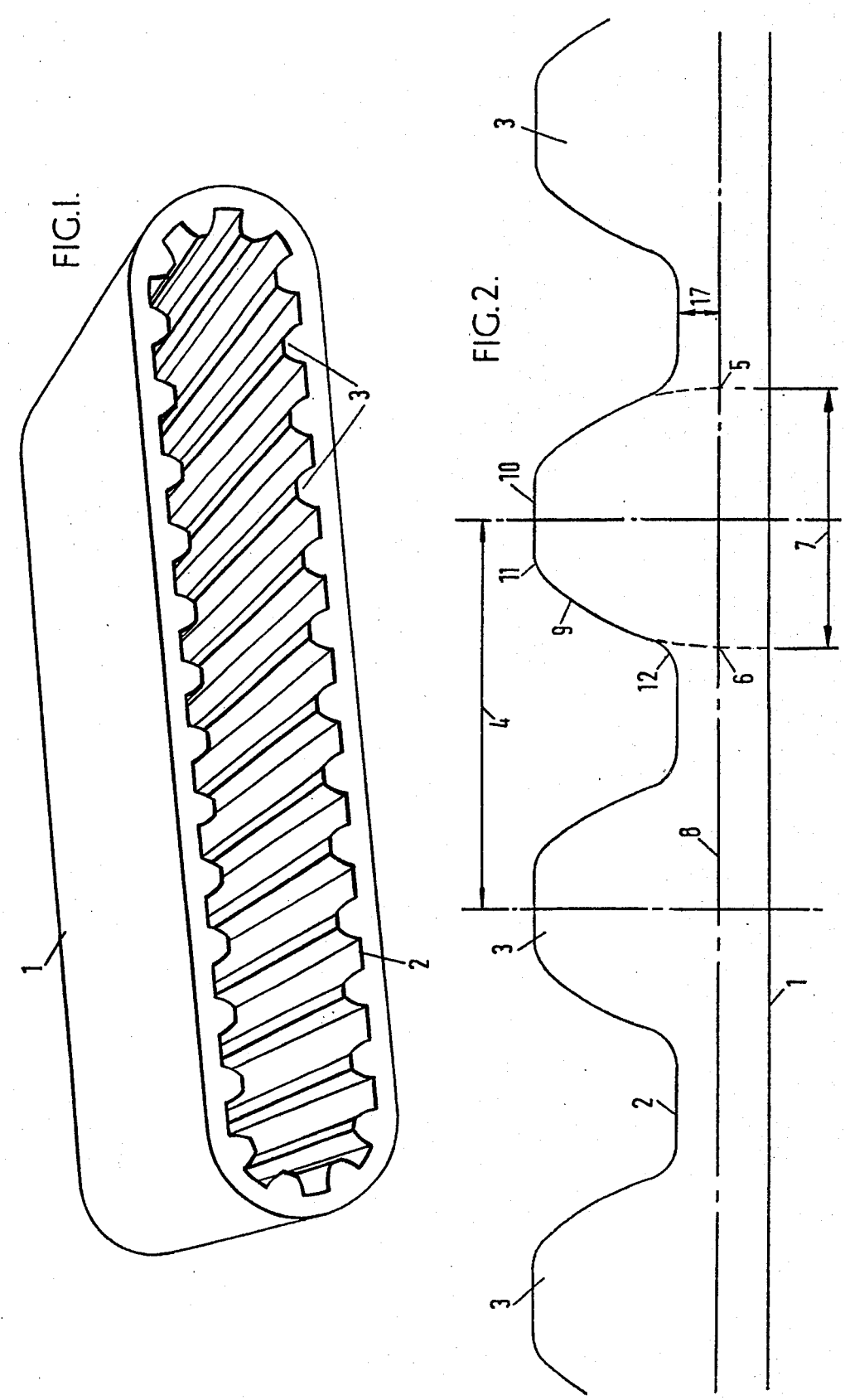

CIRCULAR SIDE POSITIVE DRIVE BELT TEETH

This is a continuation of application Ser. No. 485,642 filed July 3, 1974 now U.S. Pat. No. 3,924,481.

This invention relates to synchronous drive belts. These are endless belts upon which teeth are moulded, the teeth engaging in cavities in a pulley wheel, thus providing a synchronous drive system. This invention refers specifically to the design and form of the teeth and the corresponding pulley cavities. Synchronous drive belts are used extensively in industry and in the automotive industry as timing belts for driving camshafts and auxiliaries on engines.

In such belts a high elastic modulus is desirable in the longitudinal direction so that the belt does not stretch in service, causing the teeth to go out of mesh, and the teeth on the belt should be very securely attached to the carcass of the belt to ensure that they will not be sheared off, under the high loading imposed by the driver. It is also highly desirable that the tooth be of such a form that it may engage smoothly and not interfere with the pulley teeth, thus causing heavy wear of the side of the belt teeth, and noise. The side of the tooth in contact with the side of the pulley tooth is desirably of as large an area as possible, to keep the contact pressure low and thus minimize tooth distortion. At the present time belt teeth are generally of a trapezoid form. These are limited in width and depth in that if they are too deep, in relation to their own width, their tips will interfere with walls of the tooth cavity, when being engaged and disengaged with it. This therefore limits the contact area. This form also only has point contact with the pulley during engagement, which leads to high stresses in the tooth and consequent distortion. These factors limit the horsepower which can be transmitted through a belt of a given pitch. The object of the present invention is to overcome the deficiencies of the trapezoidal tooth form.

According to the invention there is provided an endless synchronous drive belt formed of a resilient elastomer reinforced with one or more high elastic modulus reinforcing members extending along and thereby defining the pitch line, with a succession of identical teeth uniformly spaced apart by their pitch P and possession a notional tooth width W, less than P; wherein each tooth has at least part of its fore and its aft surfaces shaped in cross section as the arc of a circle of radius W, both said arcs being centered on the pitch line at centers spaced at a distance W apart.

The top of the tooth may be flat or curved, the shape not being critical provided that clearance exists between it and the base of the pulley cavity to be used. The corners of the tooth are desirably radiused, and the pitch line of the belt should lie upon the belt's neutral axis.

Generally speaking, the ratio W:P will lie between 0.33:1 and 0.8:1 to provide belts of useful configurations. Moreover, while such a belt can be made in any size it is preferred for the pitch P to lie between 2 mm. and 30 mm.

Thus, the novel belt has a tooth profile in which the sides of the belt tooth are an arc of a circle centered on the belt pitch line (in effect, the neutral axis), and a distance of half the theoretical tooth width from the tooth center, the radius being the theoretical tooth width.

As described in more detail below the fore and aft surfaces of the teeth can be reinforced with abrasion-resistant fabric.

A further aspect of the present invention is constituted by the combination of the endless drive belt as described above together with a pulley having a plurality of identical peripheral belt-engaging teeth defining between them pulley cavities; wherein each pulley cavity has at least part of its fore and its aft surfaces shaped in cross-section as the arc of a circle of radius W + CA where CA is one-half the desired belt tooth: pulley cavity clearance, both said arcs being centered on the pitch circle at centers spaced at a distance W apart, wherein the pitch circle radius is the outer radius of the pulley at the tooth periphery plus the distance between the base of the belt between the teeth, and the belt pitch line.

The pulley cavity may be constructed by describing the pitch circle diameter, this circle has as its circumferential length the pitch of the belt multiplied by the number of teeth in the pulley. The pulley outside diameter is the pitch circle diameter less twice the pitch height of the belt. Mark the pitches on the pitch line and these will be the cavity centers. Mark a point on either side of the tooth center on the pitch at a distance of half the theoretical tooth width for the belt section. Take as the radius the theoretical tooth width plus half the total required belt tooth-cavity clearance, and center as one of the described points and describe an arc from the pulley OD to the tooth center line. Repeat for the other point. The base of the cavity may be curved or flat, its precise shape is not critical provided that there is clearance between the tip of the belt tooth and the base of the pulley cavity. The top corners should be radiused to a radius equal or greater than that of the corresponding radius on the belt.

A yet further aspect of the invention is constituted by the combination of an endless drive belt as described above together with a pulley having a plurality of identical peripheral belt-engaging teeth defining between them pulley cavities; wherein each pulley cavity has at least part of its fore and its aft surfaces shaped in cross-section as an arc of a circle of radius W + CB where CB is the desired belt tooth: pulley cavity clearance, both said arcs being centered on the pitch circle at centers spaced at a distance W + CB apart, wherein the pitch circle radius is the outer radius of the pulley at the tooth periphery plus the distance between the base of the belt between the teeth, and the belt pitch line.

This second type of pulley cavity is constructed in a similar manner with the exception that the arc comprising the cavity walls is centered on two points, which are equidistant from tooth center line, and on the pitch line, the belt theoretical tooth width plus the total required belt tooth-cavity clearance apart, and this is also the radius.

Belts according to the invention may be made as follows. The base material is a resilient elastomer which may be reinforced by a longitudinal tension member made up usually of a plurality of cords of a very high elastic modulus, these cords are centered on the belt neutral axis, and define by their position the pitch line. These cords may be made from glass fiber, carbon fiber, steel, polyester or high tenacity rayon. The tooth face may if required be reinforced with an abrasion resistant fabric, an example of which is nylon. The belt may be made from a variety of elastomers. These include polychloroprene, polyurethane, acrylonitrile rubber and the copolymer isobutylene/isoprene. The pulleys may be made from a variety of materials including metals, sintered metal, thermoset and thermoplastic polymers.

The advantages of this type of tooth form over the trapezoidal section are as follows:

1. High W:P (i.e. tooth-width/pitch) ratios are possible. This allows a broad base with a correspondingly higher shear strength.

2. Increased tooth depths are possible without interference on engagement and disengagement with small pulleys. This increases the area of the tooth which is exposed to the tangential load from the pulley cavity, thus reducing pressure at the belt-tooth/pulley-cavity interface, reducing belt distortion and minimizing surface water.

3. During engagement and disengagement of the tooth, the tooth tends to swing into the tooth cavity about that point in the pitch line where the theoretical tooth width is marked. This occurs when the moving point of engagement and disengagement of the belt pitch line and pulley pitch circle coincides with the above point until the tooth is fully engaged. During final engagement of a trapezoidal tooth interference often occurs or there is point contact.

The invention will be described further with reference to the accompanying drawings, of which:

FIG. 1 is a perspective view of a belt in accordance with the invention;

FIG. 2 is an edge view of the belt on a larger scale;

Figure 3:
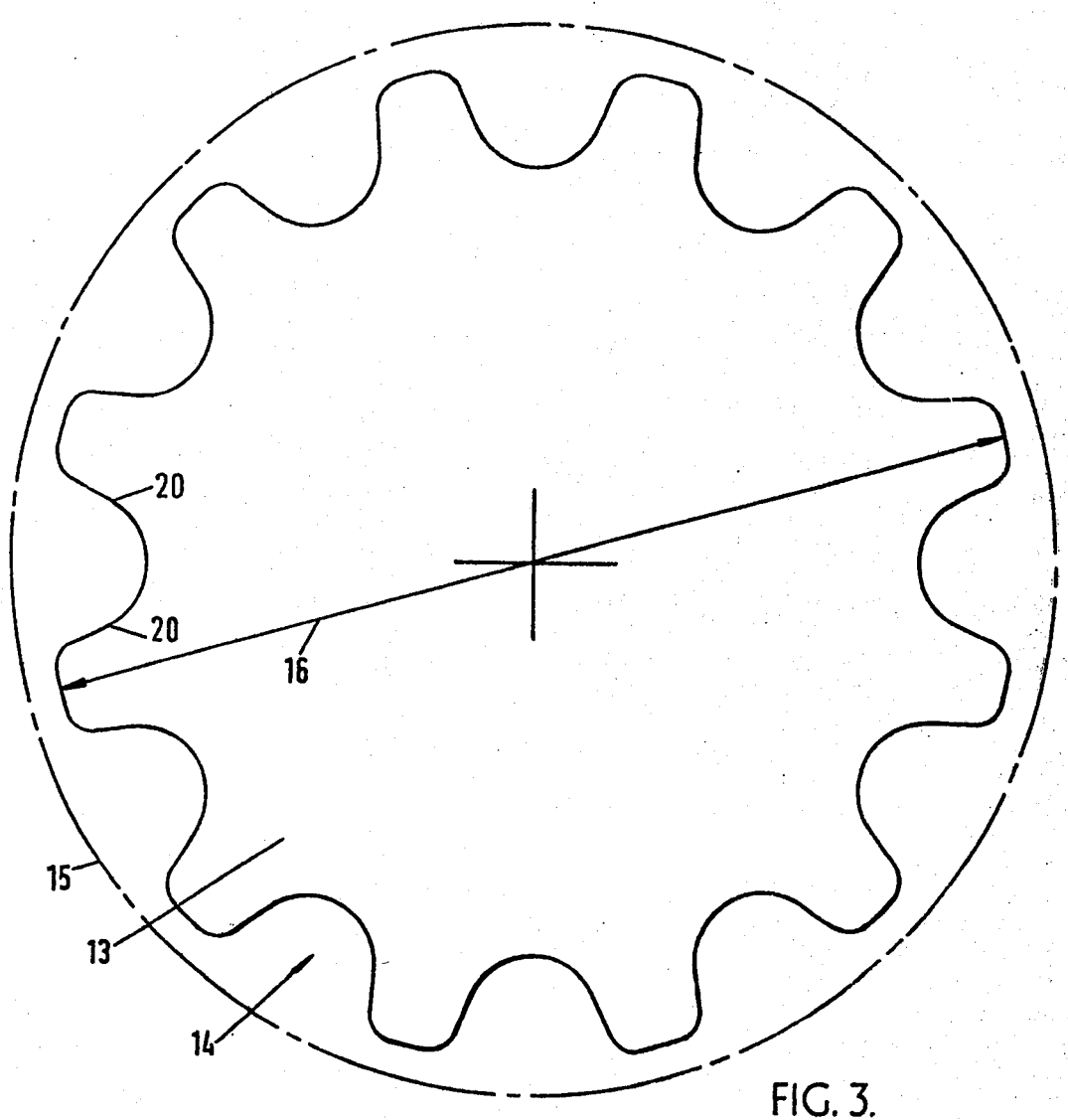
FIG. 3 is a diagrammatic side view of a pulley for use with the belt to form therewith the belt/pulley combination of the invention.

Referring to FIGS. 1 and 2, the belt comprises a generally flat outer face 1 and a toothed inner face 2. The teeth 3 are at a uniform distance 4 apart, this distance being the pitch P of the belt. The teeth 3 are notionally constructed by marking the theoretical tooth width 7 (W) as two spaced points 5 and 6 on the belt pitch line 8. Each side face 9 of the tooth constitutes an arc of a circle centered on the opposite point 5 or 6 respectively and having a radius equal to the tooth width 7. The top 10 of the tooth is shown flat, the corners 11 and 12 being radiused.

Figure 4:
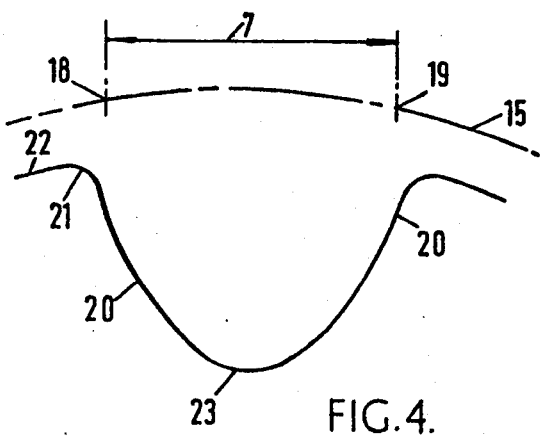
FIG. 4 is a scrap view on a larger scale of one type of pulley tooth cavity.

Referring now to FIGS. 3 and 4, the pulley 13 (only the outline of which is shown) comprises a succession of cavities 14 to accommodate the belt teeth 3. Each such cavity may notionally be constructed by circumscribing the pulley 13 by the pitch circle 15. The pulley outside diameter 16 is then, as already explained, the pitch circle diameter less twice the pitch height 17 (FIG. 2) of the belt. The tooth width 7 is marked on the pitch circle (FIG. 4) as two spaced points 18 and 19 and circular arcs 20 are drawn centered on the points 18 and 19 and having as radius the tooth width W (7) plus a factor CA, which is half the total desired belt-tooth/cavity clearance. These two circular arcs 20 then represent the sides of the pulley cavities. The junction 21 between a respective arc 20 and the pulley outside diameter 22 should normally be radiused, while the region where the arcs would intersect may be left flat or (as shown at 23) curved.

Figure 5:
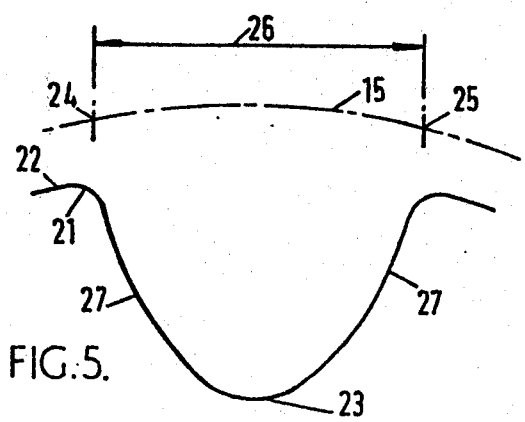
FIG. 5 is a like scrap view of another type of pulley tooth cavity.

In a modification, as shown in FIG. 5, the points 24 and 25 corresponding to the points 18 and 19 of FIG. 4 are spaced apart by a distance 26 equal to the belt tooth width W plus the belt tooth/pulley cavity desired clearance CB. This distance 26 is then taken as the radius of the circular arcs 27 centered on the points 24 and 25, these arcs corresponding to the arcs 20 of FIG. 4. The construction is otherwise similar.

While certain representative embodiments and details have been shown for the purpose of illustrating the invention, it will be apparent to those skilled in this art that various changes and modifications may be made therein without departing from the spirit or scope of the invention.

I claim:

1. A pulley for use with a belt in a synchronous drive wherein the belt has a plurality of uniformly spaced, substantially identical teeth of a width W, said pulley having a plurality of substantially identical belt engaging teeth to mate with said belt teeth and defining a pulley cavity between each adjacent pair of teeth with each cavity having substantially identical fore and aft surfaces, at least part of which surfaces are shaped in cross-section as the arc of a circle of radius $W + CA$ where CA is one-half the desired belt tooth: pulley cavity clearance; both said arcs being centered on the pitch circle at centers spaced at a distance W apart, the pitch circle diameter being the outer diameter of the pulley teeth plus twice the distance between the pulley surface of the belt between the teeth and the belt pitch line.

2. A pulley for use with a belt in a synchronous drive wherein the belt has a plurality of uniformly spaced, substantially identical teeth of a width W, said pulley having a plurality of substantially identical belt engaging teeth to mate with said belt teeth and defining a pulley cavity between each adjacent pair of teeth with each cavity having substantially identical fore and aft surfaces, at least part of which surfaces are shaped in cross-section as the arc of a circle of radius $W + CB$ where CB is the desired belt tooth: pulley cavity clearance; both said arcs being centered on the pitch circle at centers spaced at a distance $W + CB$ apart, the pitch circle diameter being the outer diameter of the pulley teeth plus twice the distance between the pulley surface of the belt between the teeth and the belt pitch line.

* * * * *